(12) United States Patent
Nelson et al.

(10) Patent No.: US 8,318,120 B2
(45) Date of Patent: Nov. 27, 2012

(54) PROCESS FOR THE SURFACE MODIFICATION OF PARTICLES

(75) Inventors: James M. Nelson, Woodbury, MN (US); Matthew N. Archibald, St. Paul, MN (US); Wendy L. Thompson, Roseville, MN (US); Grant F. Tiefenbruck, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/988,092

(22) PCT Filed: Apr. 17, 2009

(86) PCT No.: PCT/US2009/040947
§ 371 (c)(1),
(2), (4) Date: Nov. 16, 2010

(87) PCT Pub. No.: WO2009/131910
PCT Pub. Date: Oct. 29, 2009

(65) Prior Publication Data
US 2011/0048923 A1  Mar. 3, 2011

Related U.S. Application Data

(60) Provisional application No. 61/047,849, filed on Apr. 25, 2008.

(51) Int. Cl.
*C01B 33/12* (2006.01)
*C01D 1/02* (2006.01)
(52) U.S. Cl. ............... 423/335; 423/593.1; 423/339; 423/265
(58) Field of Classification Search ............ 423/335, 423/592.1; 204/157.43, 157.5, 157.51, 157.74, 204/157.73, 157.76, 157.81, 157.75; 556/9, 556/173, 466; 219/686, 687, 756; 977/895, 977/773, 775, 777, 811; 422/186.29, 186, 422/186.04, 21
See application file for complete search history.

(56) References Cited

U.S. PATENT DOCUMENTS

| | | | |
|---|---|---|---|
| 2,801,185 A | 5/1952 | Iler |
| 3,018,262 A | 1/1962 | Schroeder |
| 3,298,998 A | 1/1967 | McConnell |
| 3,562,223 A | 2/1971 | Bargain |

(Continued)

FOREIGN PATENT DOCUMENTS

EP  0 452 711  10/1991

(Continued)

OTHER PUBLICATIONS

Adachi et al, "Novel Synthesis of Submicrometer Silica Spheres in Non-alcoholic Solvent by Microwave-assisted Sol-Gel Method", Sep. 2004, Chemistry Letters vol. 33, No. 11, pp. 1504-1505.*

(Continued)

*Primary Examiner* — Steven Bos
*Assistant Examiner* — Justin Bova
(74) *Attorney, Agent, or Firm* — Adam Bramwell

(57) ABSTRACT

A method for the preparation of functionalized particles includes providing a feedstock made of particles, a surface treatment agent reactive with the particles, and solvent. The feedstock is exposed to microwave radiation to heat the feedstock and react the particles with the surface treatment agent to provide the functionalized particles in less than about 60 minutes.

11 Claims, 1 Drawing Sheet

U.S. PATENT DOCUMENTS

| | | | |
|---|---|---|---|
| 3,627,780 A | 12/1971 | Bonnard | |
| 3,839,358 A | 10/1974 | Bargain | |
| 4,100,140 A | 7/1978 | Zahir | |
| 4,157,360 A | 6/1979 | Prevorsek | |
| 4,468,497 A | 8/1984 | Street | |
| 4,522,958 A | 6/1985 | Das | |
| 5,453,262 A | 9/1995 | Dawson | |
| 5,648,407 A | 7/1997 | Goetz | |
| 7,033,975 B2 | 4/2006 | Baran | |
| 7,241,437 B2 | 7/2007 | Davidson | |
| 2002/0055580 A1 | 5/2002 | Lorah | |
| 2003/0035756 A1 | 2/2003 | Nelson | |
| 2003/0220204 A1 | 11/2003 | Baran | |
| 2004/0138343 A1* | 7/2004 | Campbell et al. | 523/216 |
| 2005/0063898 A1* | 3/2005 | Ja Chisholm | 423/608 |
| 2006/0060998 A1* | 3/2006 | Strouse et al. | 264/5 |
| 2006/0135669 A1* | 6/2006 | Ryang | 524/430 |
| 2006/0148950 A1 | 7/2006 | Davidson | |
| 2006/0216759 A1* | 9/2006 | Naasani | 435/7.5 |
| 2007/0003463 A1 | 1/2007 | Ajiri | |
| 2007/0032560 A1 | 2/2007 | Suemura | |
| 2007/0098990 A1 | 5/2007 | Cook | |
| 2010/0267881 A1 | 10/2010 | Tiefenbruck | |

FOREIGN PATENT DOCUMENTS

| | | |
|---|---|---|
| JP | 2003-286306 | 10/2003 |
| JP | 2004-051681 | 2/2004 |
| JP | 2004-331883 | 11/2004 |
| JP | 10-2007-0098781 | 10/2007 |
| WO | WO 2004/113455 | 12/2004 |
| WO | WO 2005/080498 | 9/2005 |
| WO | WO 2006/063317 | 6/2006 |
| WO | WO 2007/024838 | 3/2007 |
| WO | WO 2007/031775 | 3/2007 |
| WO | WO 2007/119993 | 10/2007 |
| WO | WO 2008/027979 | 3/2008 |
| WO | WO 2009/110945 | 9/2009 |
| WO | WO 2009/120846 | 10/2009 |
| WO | WO 2009/120868 | 10/2009 |
| WO | WO 2010/080459 | 7/2010 |

OTHER PUBLICATIONS

Kappe et al, "Microwaves in Organic and Medicinal Chemistry" 2005, Wiley VCH, pp. 39-40.*

Paulus et al, "Scale up of Microwave Assisted Polymerizations in Continuous flow mode.." Feb. 21, 2007, Macromolecular Rapid Communications, 2007, 28, pp. 484-491.*

Adschiri et al., *J. Am. Ceram. Soc.*, vol. 75, No. 4, pp. 1019-1022 (1992).

Epoxy Resins, Chemistry and Technology, Second Edition, edited by C. May, Marcel Dekker, Inc., New York (1988).

Handbook of Epoxy Resins by Lee and Neville, McGraw-Hill Book Co., New York (1967).

Handbook of Thermoset Plastics (Second Edition), William Andrew Publishing, p. 122 (1998).

Iler, The Chemistry of Silica, John Wiley & Sons, New York (1979).

Schmidt, et al., "Fabrication of agglomerate-free nanopowders by hydrothermal chemical processing", *Mater. Res. Soc. Symp. Proc.*, vol. 520, Warrendale, PA pp. 21-31 (1998).

* cited by examiner

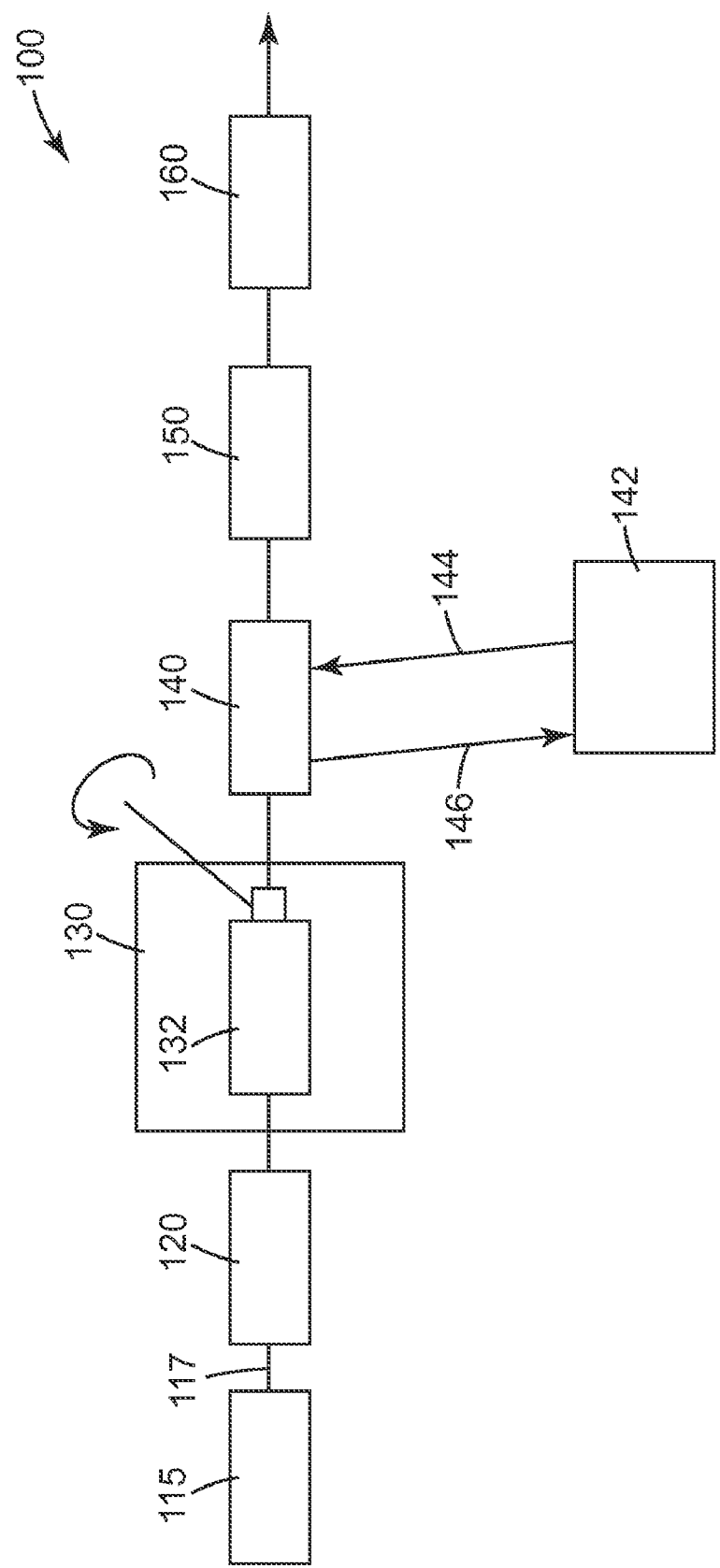

PROCESS FOR THE SURFACE MODIFICATION OF PARTICLES

Cross Reference to Related Applications

This application is a national stage filing under 35 U.S.C. 371 of PCT/US2009/040947, filed Apr. 17, 2009, which claims priority to Provisional application Ser. No. 61/047,849, filed Apr. 25, 2008, the disclosure of which is incorporated by reference in its/their entirety herein.

The present invention relates to a method for the preparation of functionalized particles using a microwave reactor to initiate the reaction between particles and surface treatment agent.

BACKGROUND

Composite materials incorporating certain particles such as metal oxide particles, for example, can be useful if the particles are compatible with surrounding matrix materials, usually organic polymers. One technique to achieve compatibility is by the chemical modification of the surface of the particle.

Techniques for accomplishing the surface modification of particles are known. For example, hydrolyzed alkoxysilane can be reacted with hydroxyl groups on the surface of particles to provide silane functionalized particles. In batch reactor systems operated at or below the boiling point of the solvent solution (e.g., mixture of water and alcohol), these reactions can take anywhere from two hours up to about 24 hours to complete. The lengthy reaction time for this surface modification process has kept manufacturing costs high. Because of the high cost, economic uses for functionalized particles have been limited.

SUMMARY

The present invention provides an improved process for the production of functionalized particles. In one aspect, the invention provides a method for the preparation of functionalized particles, the method comprising:

Providing a feedstock at a first temperature, the feedstock comprising
particles,
a surface treatment agent reactive with the particles,
solvent; and
Exposing the feedstock to microwave radiation to heat the feedstock and react the particles with the surface treatment agent to provide the functionalized particles in less than about 60 minutes.

Various terms used herein to describe aspects of the present invention will be understood to have the same meaning known to those skilled in the art. For clarification, certain terms shall be understood to have the meaning set forth herein.

"Organic matrix" refers to a polymeric material or a precursor (e.g., monomer or oligomer) to a polymeric material.

"Microwave" refers to a form of electromagnetic energy characterized by wavelengths within the electromagnetic spectrum between 1 mm and 1 meter, and corresponding to frequencies between 100 and 5,000 MHz.

"Substantially symmetric particles" refers to particles that are relatively symmetric in that the length, width and height measurements are substantially the same and the average aspect ratio of such particles is approximately 1.

As used herein, the recitation of numerical ranges by endpoints includes all numbers subsumed within that range (e.g., 1 to 5 includes 1, 1.5, 2, 2.75, 3, 3.8, 4, and 5).

As included herein, the singular form of a noun that follows the indefinite article "a" or "an" is to be presumed to encompass the plural form of the noun unless the context clearly dictates otherwise.

Unless otherwise indicated, all numbers expressing quantities or ingredients, measurement of properties and so forth used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present disclosure. At the very least, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains errors necessarily resulting from the standard deviations found in their respective testing measurements.

BRIEF DESCRIPTION OF THE FIGURES

In describing embodiments of the invention, reference is made to the Figures in which components of the embodiments are identified with reference numerals and wherein like reference numerals indicate like components, and wherein:

FIG. 1 is a schematic of a continuous microwave reactor system according to an embodiment of the invention.

Those skilled in the art will understand the features of the invention upon further consideration of the embodiments described in the remainder of disclosure including the Detailed Description, the Examples and the appended claims.

DETAILED DESCRIPTION

The present invention provides a process for the preparation of functionalized particles using one or more surface treatment agent(s) reactive with functional groups on the surface of untreated particles. By "reactive," it is meant that the surface treatment agent(s) interact with functional groups on the surfaces of untreated particles either through covalent bonding, ionic bonding, hydrogen bonding or the like. The process of the invention facilitates the rapid processing of reactants to rapidly react particles with surface treatment agent(s) and thereby provide functionalized particles, including microparticles and nanoparticles, in a shortened period of time as compared with prior synthetic approaches for the surface treatment of particles. The process of the invention utilizes closed vessel microwave heating of the reaction components to provide accelerated reaction rates in the preparation of the functionalized particles.

In some embodiments of the invention, the particles are substantially symmetric microparticles or nanoparticles. By way of example, substantially symmetric particles include those that are substantially spherical, substantially cubic, or the like. In other embodiments, the particles useful in the invention are not symmetric in all three spatial measurements. Such asymmetric particles may be, for example, needle-like or oblong in that individual particles comprise a longitudinal axis and a lateral axis, the longitudinal axis being longer than the lateral axis. Stated another way, substantially symmetric particles typically display a length, width and height that are substantially equal while asymmetric particles have at least one spatial measurement that is greater or less than the other two.

The process of the present invention provides functionalized particles, in some embodiments functionalized nanoparticles, more rapidly than in open reaction vessels operated at ambient pressure. Functionalized particles resulting from the process of the invention may be incorporated into composite materials used, for example, as abrasion resistant coatings, high refractive index coatings, or coatings that are resistant to the effects of ultraviolet radiation. Moreover, the process of the invention facilitates rapid reaction rates, improved control of the reaction and the potential for high throughput. In some embodiments, the preparation of surface modified particles according to the invention can be achieved in a batch synthesis. In some embodiments, the process of the invention is utilized in a continuous process for the preparation of filled composites wherein the functionalized particles are mixed with organic matrix (e.g., polymer) without the need to first remove solvent or dry the functionalized particles. The functionalized nanoparticles prepared according to the present invention are suitable for use in any of a variety of composite materials including, by way of example, fiberglass resin composites and optical quality films.

Starting materials for the process of the invention are initially mixed to provide a feedstock comprising unreacted particles, solvent and one or more surface treatment agent(s). In an aqueous medium (e.g., water is the principal solvent) the unreacted particles form a hydrosol to which the surface treatment agent is added. Optional co-solvent may be included in the formulation of an aqueous feedstock when co-solvent is needed to compatibilizing the surface treatment agent(s) with the aqueous sol. In some embodiments, the particles are dispersed into an organic solvent to provide an organosol. In still other embodiments, the particles are dispersed into mixed sols (where the liquid medium comprises both water and an organic liquid).

In the formulation of a sol, unreacted particles are added to solvent. In embodiments of the invention, the particles are relatively uniform in size and non-aggregating when included in a sol. Useful particles may be any of a variety of sizes depending on the desired use of the final functionalized product. In some embodiments, the particles are microparticles in that they have an average thickness of one micrometer or greater. In some embodiments, the particles have an average thickness up to about 30 micrometers. In some embodiments, the particles are nanoparticles in that they have an average thickness (e.g., length, width or height) of less than about one micrometer, in some embodiments less than about 500 nm, in some embodiments less than about 100 nm, and in some embodiments less than about 50 nm. In some embodiments, the particles are substantially symmetric.

The unreacted particles can comprise any of a variety of materials. In some embodiments the particles comprise organic materials, and in other embodiments the particles comprise inorganic materials. In embodiments of the invention, the particles may be selected from broad categories of inorganic materials that include without limitation metals, inorganic oxides, inorganic sulfides, inorganic antimonides, inorganic salts, inorganic nitrides, metallic particles, metal coated particles, for example. Suitable organic materials include carbon black and organic pigments, for example. Inorganic pigments may also be used.

In embodiments of the invention utilizing inorganic particles, the particles may include metal particles such as, for example, particles of gold, platinum, silver, nickel and combinations of two or more of the foregoing.

In some embodiments, organic particles such as carbon black and organic pigments are useful in the process of the invention. Inorganic pigments may also be used such as red iron oxide, yellow 763ED (Pb chromate), green Co (Al, Cr)$_2$O$_4$, sodium alumino sulphosilicate (ultramarine blue), strontium carbonate, zinc phosphate, magnesium carbonate hydroxide and combinations of two or more of the foregoing.

Inorganic oxides may be suitable for use in the process of the invention. Suitable oxides include zirconia, aluminum oxide, titanium dioxide, iron oxide, zinc oxide, silicon dioxide (silica) antimony trioxide, boron oxide, boron suboxide, bismuth(III) oxide, copper(I) oxide, copper(II) oxide, chromium(III) oxide, iron(II) oxide, iron (III) oxide, magnesium oxide—MgO, manganese(IV) oxide (manganese dioxide—MnO$_2$).

In some embodiments, suitable particles include particles of inorganic sulfides which can include without limitation copper(I) sulfide—Cu$_2$S, copper(II) sulfide—CuS and zinc sulfide—ZnS. In some embodiments, suitable particles include particles of indium phosphide, aluminum phosphide, brass, metal coated glass, boron carbide—B$_4$C, boron nitride—BN, calcium carbide—CaC$_2$, calcium hydroxide, copper(II) hydroxide, lithium hydroxide, magnesium hydroxide, aluminum, aluminum hydroxide, aluminum sulfate, calcium sulfate, cobalt(II) carbonate, copper(II) carbonate, copper(II) nitrate, copper(II) sulfate, lithium carbonate, lithium nitrate—LiNO$_3$, lithium sulfate—Li$_2$SO$_4$, magnesium carbonate—MgCO$_3$, magnesium phosphate—Mg$_3$(PO$_4$)$_2$, magnesium sulfate—MgSO$_4$, manganese(II) sulfate monohydrate—MnSO$_4$.H$_2$O, manganese(II) phosphate—Mn$_3$(PO$_4$)$_2$, nickel(II) carbonate—NiCO$_3$, nickel(II) hydroxide—Ni(OH)$_2$, nickel(II) nitrate—Ni(NO$_3$)$_2$, silicon dioxide—SiO$_2$, titanium dioxide (titanium(IV) oxide)—TiO$_2$, zinc carbonate—ZnCO$_3$, zinc oxide—ZnO, zinc sulfate—ZnSO$_4$.

Combinations of any two or more of the foregoing particulate materials are contemplated within the scope of the present invention.

In certain embodiments of the invention, the unreacted particles comprise silicon dioxide (SiO$_2$ or "silica"). Suitable silicon dioxide particles can be provided as nanoparticles or as microparticles. In some embodiments, silicon dioxide particles are solid particles (e.g., not hollow). In some embodiments, silicon dioxide particles can be provided as hollow glass microspheres. In other embodiments, silicon dioxide particles can be provided as solid (e.g., not hollow) glass beads. In some embodiments, colloidal silica is preferred. Other colloidal metal oxides can be utilized such as colloidal titania, colloidal alumina, colloidal zirconia, colloidal vanadia, colloidal chromia, colloidal iron oxide, colloidal antimony oxide, colloidal tin oxide, and mixtures of two or more of the foregoing. Suitable colloidal particles can comprise essentially a single oxide such as silica or can comprise a core of an oxide of one type over which is deposited an oxide of another type. In some embodiments, a suitable colloidal particle comprises a core of a material other than a metal oxide over which is deposited a metal oxide.

Colloidal microparticles or nanoparticles are preferably relatively uniform in size and remain substantially non-aggregated in order to avoid aggregation, precipitation, gellation, or a dramatic increase in sol viscosity. In some embodiments, a particularly desirable class of particles for use in the invention includes sols of inorganic particles (e.g., colloidal dispersions of inorganic particles in liquid media), especially sols of amorphous silica. Such sols can be prepared by a variety of techniques and in a variety of forms which include hydrosols (where water serves as the liquid medium), organosols (where organic liquids are used), and mixed sols (where the liquid medium comprises both water and an organic liquid). See, e.g., U.S. Pat. Nos. 2,801,185 (Iler) and 4,522,958 (Das et al.). See also, R. K. Iler in The Chemistry of Silica, John Wiley & Sons, New York (1979).

Suitable silica hydrosols are commercially available in a variety of particle sizes and concentrations such as those available from Ondeo Nalco Chemical Company of Naperville, Ill. under the trade designations "Nalco 2329" and "Nalco 2327." Another source of a suitable silica sol is commercially available under the trade designation "Nissan MP2040" from Nissan Chemical America Corporation of Houston, Tex. Silica hydrosols can be prepared, e.g., by partially neutralizing an aqueous solution of an alkali metal silicate with acid to a pH of about 8 or 9 (such that the resulting sodium content of the solution is less than about 1 percent by weight based on sodium oxide). Other methods of preparing silica hydrosols are known, e.g., electrodialysis, ion exchange of sodium silicate, hydrolysis of silicon compounds, and dissolution of elemental silicon.

In the present invention, a feedstock is prepared by combining particles with surface treatment agent, typically in a sol. The process of the invention provides functionalized particles that are compatible with an organic matrix material such as an organic polymer. Suitable surface treatment agents include without limitation organosilanes, organotitanates, organozirconates, organoacids, organoamines, organothiols, phosphinic acids and combinations thereof.

In applications where the particles comprise colloidal silicon dioxide, zirconium oxide, titanium dioxide, the concentration of particles in the sol is typically between about 60% and about 20% by weight, in some embodiments between 55% and 30% by weight, in some embodiments between about 35% and 45% by weight.

Additionally, mixtures of particles that differ in particle size may be surface treated according to the invention. Examples of some suitable combinations of particle sizes include mixtures of particles having a thickness of about 20 nm with other larger particles such as those having a thickness of about 142 nm. Additionally, 20 nm particles may be combined with 200 nm particles, and 20 nm particles with 500 nm particles. Suitable weight ratios of the foregoing combined particle sizes can be within a wide range, in some embodiments between 1/20 and 20/1.

In embodiments of the invention, reactive groups (e.g., hydroxyl groups) on the surface of the particles are utilized to interact with surface treatment agent(s) to form functionalized particles. In certain embodiments, reactive groups (e.g., hydroxyl groups) on the surface of the particles covalently bond with surface treatment agent(s). In some embodiments, reactive groups on the surface of the particles ionically bond with surface treatment agent(s).

In embodiments of the invention utilizing oxide particles (e.g., silicon dioxide, titanium dioxide, zirconium dioxide, etc.), suitable surface treatment agents include those that are reactive with hydroxyl groups along the surface of the particles. In some embodiments, suitable surface treatment agents include organosilanes. In some embodiments, suitable organosilanes include one organic substituent and three hydrolysable substituents. Exemplary organosilanes include: [2-(3-cyclohexenyl)ethyl]trimethoxysilane, trimethoxy(7-octen-1-yl) silane, isooctyl trimethoxy-silane, N-(3-triethoxysilylpropyl)methoxyethoxyethoxyethyl carbamate, N-(3-triethoxysilylpropyl)methoxy-ethoxyethoxyethyl carbamate, 3-(methacryloyloxy)propyltrimethoxysilane, allyl trimethoxysilane, 3-acryloxypropyltrimethoxysilane, 3-(methacryloyloxy)propyl-triethoxysilane, 3-(methacryloyloxy) propylmethyldimethoxysilane, 3-acryloyloxypropyl)methyldimethoxysilane, -9-3-(methacryloyloxy)propyl-dimethylethoxysilane, 3-(methacryloyloxy) propyldimethylethoxysilane, vinyldimethyl-ethoxysilane, phenyltrimethoxysilane, n-octyltrimethoxysilane, dodecyltrimethoxysilane, isooctyltrimethoxysilane octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-tbutoxysilane, vinyltrisisobutoxysilane, vinyltriisopropenoxysilane, vinyltris(2-methoxyethoxy)silane, styrylethyltrimethoxysilane, mercaptopropyltrimethoxysilane, 3-glycidoxypropyl-trimethoxysilane, Heptamethyl(2-[tris(2-methoxyethoxy)silyl]ethyl)trisiloxane (e.g., as described in U.S. Pat. No. 7,033,975) polydimethylsiloxane, arylsilanes, including, e.g., substituted and unsubstituted arylsilanes, alkylsilanes, including, e.g., substituted and unsubstituted alkyl silanes, including, e.g., methoxy and hydroxy substituted alkyl silanes, and combinations of two or more of the foregoing.

Suitable surface treatments for silica particle inclusion in polyurethane environments can be produced by reaction of suitable difunctional or trifunctional polyols with 3-triethoxysilyl propyl isocyanate, resulting in urethane linkages. Suitable polyols include polyethylene glycol, polypropylene glycol, polycaprolactone polyol (e.g., Tone 2221, available from Dow Chemical, Midland Mich.), hydroxyl-terminated polybutadienes and poly(tetramethylene ether) glycol.

Other surface treatment agents suitable for use with oxide particles include acrylic acid, methacrylic acid, oleic acid, stearic acid, dodecanoic acid, 2-[2-(2-methoxyethoxy)-ethoxy]acetic acid (MEEAA), betacarboxyethylacrylate, 2-(2-methoxyethoxy)acetic acid, methoxyphenyl acetic acid, and combinations of two or more of the foregoing. In some embodiments, a proprietary silane surface modifier identified by the trade name "Silquest A1230" (commercially available from Momentive Specialties of Wilton, Conn.), may be used.

In some embodiments, suitable surface treatment agents include alkyl amines and/or aryl amines. In certain embodiments, surface treatment agents comprising $C_1$-$C_{30}$ alkyl and aryl amines may be used, particularly polyethylene glycol-functional amines (e.g., jeffamine materials), stearyl amine, behenyl amine, and combinations thereof. In other embodiments, suitable surface treatment agents include those comprising thiols and, in particular, $C_1$-$C_{30}$ alkyl and aryl thiols. In other embodiments, surface treatment agents comprising carboxylic acids may be desired, particularly those comprising $C_1$-$C_{30}$ alkyl and aryl carboxylic acids. In still other embodiments, surface treatment agents comprising phosphinic acids may be desired, particularly those comprising $C_1$-$C_{30}$ alkyl and aryl phosphinic acids.

In embodiments wherein water is used as the principal solvent, organic co-solvent may optionally be added to the sol to facilitate the solubility of the surface treatment agent as well as the functionalized particles. Suitable co-solvents comprise any of a variety of water miscible organic solvents. In some embodiments, co-solvent(s) may be selected from the group that includes, for example, 1-methoxy-2-propanol, ethanol, isopropanol, ethylene glycol, N,N-dimethylacetamide, ethyl acetate, and/or 1-methyl-2-pyrrolidinone, dimethyl formamide, diethylene glycol dimethyl ether (diglyme), methanol, methoxy(ethoxy(ethoxy))ethanol as well as mixtures of two or more of the foregoing.

Carbonaceous particles such as carbon black may be surface treated in solvents such as toluene, benzene or ethyl benzene. In some embodiments, particle concentrations for such carbonaceous particles is within the range from about 5% to about 25 wt % with surface treatment loadings from about 0.05% to about 0.1 wt %. In some embodiments, surface treatment agents are selected from zirconates, titanates and organic aryl/alkylamines as well as combinations thereof.

The feedstock is heated for a sufficient period of time using a microwave source to convert untreated particles and surface treatment agent(s) in the feedstock to surface-functionalized particles. The residence time of the feedstock in the microwave field is determined by known factors including the microwave field intensity to which the feedstock is exposed, the volume of feedstock within the reaction vessel, the degree of surface treatment desired and the like. In some embodiments, the residence time is at least 2 minutes and no greater than 2 hours.

One embodiment of a system for facilitating the functionalization of particle surfaces using microwave heating is shown schematically in FIG. 1. The system 100 operates in a continuous mode. Feedstock is prepared to comprise surface treatment agent(s) and untreated particles (e.g., colloidal silica nanoparticles) in a sol which is placed within a vessel 115. The vessel 115 is connected with tubing or piping 117 to a pump (e.g., a diaphragm pump) 120. Tubing or piping 117 can be constructed of any suitable (e.g., non-reactive) material such as polymeric materials or ceramic materials, for example. Polyethylene tubing or polypropylene tubing may be suitable in the portions of the system 100 that are not heated and/or are not under high pressure. Pump 120 is configured to pump the feedstock from vessel 115 into a reaction vessel 132 within a microwave cavity 130. The flow of feedstock into the microwave cavity 130 is controlled by pump 120 and may be at a constant flow rate or it can be at a non-constant or pulsed flow rate.

Once feedstock is within the microwave cavity 130, it is exposed to microwave radiation for a predetermined period of time sufficient to convert the untreated particles to surface-functionalized particles. Reactor 132 may be provided with an optional stir shaft 134 which may be coupled to a mechanical motor (not shown) to stir/agitate the feedstock within reactor 132 while the feedstock is exposed to microwave radiation. Following completion of the surface functionalization reaction, the reaction product is flowed from the reactor 132 through tubing 117 and into a chilled heat exchanger 140. Recirculator 142 delivers coolant (e.g., chilled water) to the heat exchanger 140 through flow line 144 and returns the coolant through return line 146.

The pressure inside the system 100 and reactor 132 is at least partially controlled with a backpressure valve 150, which is generally positioned after the heat exchanger 140. The backpressure valve 150 controls the pressure at the exit of the system 100 and helps to control the pressure within the reactor 132. The backpressure is often at least 100 pounds per square inch (0.7 MPa), at least 200 pounds per square inch (1.4 MPa), at least 300 pounds per square inch (2.1 MPa), at least 400 pounds per square inch (2.8 MPa), at least 500 pounds per square inch (3.5 MPa), at least 600 pounds per square inch (4.2 MPa), or at least 700 pounds per square inch (4.9 MPa). In some embodiments, the backpressure is greater than about 700 pounds per square inch (4.9 MPa). The backpressure should typically be high enough to prevent boiling within the reactor 132.

In embodiments of the invention, the feedstock in the reactor 132 is held at a temperature greater than the hydrolysis and condensation reaction temperatures of the surface treatment agent(s). Microwave heating can raise the temperature of the feedstock to at least 130° C., at least 140° C., or at least 150° C. If the temperature is too high, the pressure of the reactor may also be unacceptably high. The temperature is typically no greater than 230° C., no greater then 225° C., or no greater than 220° C. In many embodiments, the reaction temperature is selected to be in the range of 130° C. to 230° C., in the range of 140° C. to 220° C., in the range of 140° C. to 200° C., in the range of 150° C. to 200° C., or in the range of 150° C. to 180° C.

The residence time of the feedstock within the reactor 132 can be varied by altering the flow rate of the feedstock through the system 100. In embodiments, the residence time is in the reactor 132 during which the feedstock is exposed to microwave radiation is less than about 2 minutes. In other embodiments, the exposure time is at least 2 minutes, at least 4 minutes, at least 6 minutes, at least 8 minutes, or at least 10 minutes. The residence time during which the feedstock is exposed to microwave radiation is typically no greater than 2 hours, no greater than 90 minutes, no greater than 60 minutes, or no greater than 50 minutes. In many embodiments, the feedstock is exposed to microwave radiation for a period of time in the range of 2 to 90 minutes or in the range of 2 to 60 minutes.

Reaction product or effluent from the reactor 132 may be collected in a collection vessel 160. At least a portion of the solvent, (e.g., water) in the effluent may be removed prior to further using the functionalized particles (e.g., by adding the particles to an organic matrix). In some embodiments, effluent can be dried at an elevated temperature to facilitate the removal of the solvent.

Organic matrix can be added to the surface treated particles either before or after removal of solvent. If the organic matrix is added before removal of solvent (e.g., water) and the boiling point of the organic matrix is greater than the boiling point of water, the water can be removed using a method such as distillation, rotary evaporation, or oven drying.

The organic matrix typically includes a polymeric material or a precursor to a polymeric material such as a monomer or a oligomer having a polymerizable group. Any suitable technique can be used to combine the functionalized particles with the organic matrix. For example, if the organic matrix is a precursor to a polymeric material, the functionalized particles can be added prior to the polymerization reaction. If the polymeric material is a thermoplastic polymer, the polymeric material and the functionalized particles can be combined using a suitable mixing process such as extrusion, milling or Brabender mixing. The composite material containing a precursor of a polymeric material is often shaped or coated before polymerization.

Representative examples of monomers include, but are not limited to, (meth)acrylates, styrenes, epoxies, and the like. Representative examples of reactive oligomers include, but are not limited to, (meth)acrylated polyesters, (meth)acrylated polyurethanes, or acrylics. Representative examples of polymeric material include, but are not limited to, polyolefins, polyesters, polyurethanes, poly(meth)acrylates, polystyrenes, polycarbonates, and polyimides.

One exemplary process for forming a composite material includes concentrating the effluent from the hydrothermal reactor to about 40 percent solids or more using a method such as distillation or rotary evaporation, falling film evaporation, wiping film evaporation, gap drying, spray drying or the like. A co-solvent and surface modification agent can be added to the concentrate. After addition of the organic matrix, the co-solvent, and water are removed. At least a portion of dissolved carboxylic acid and/or anion thereof can be removed during the concentration step or after surface modification.

The addition of the functionalized particles to an organic matrix such as a polymeric material can be advantageous. For example, the functionalized particles can be added to increase the tensile strength of a polymeric material or can be added as a thickener to an organic matrix. Because the functionalized particles can be smaller than the wavelengths of visible light, their presence in an organic matrix often cannot be detected with the unaided eye. That is, the tensile strength or thickness of an organic matrix can be increased without affecting the appearance of the organic matrix. For example, the functionalized particles can be suspended or dispersed in an organic matrix for applications where a high optical transmission is desired.

EXAMPLES

Additional embodiments of the invention are described in the following non-limiting Examples.

Procedure 1: Continuous Flow Microwave Hydrothermal Reactor

A continuous flow microwave reactor system (commercially available under the trade designation FLOWSYNTH, obtained from Milestone, Inc. of Shelton, Conn.) was used to provide functionalized particles. The FLOWSYNTH system consisted of a diaphragm pump, a 0.18 liter stirred reactor cavity and a chilled exit port, cooled through use of a water recirculator. Feedstock was gravity fed from plastic vessels to the inlet of the diaphragm pump and into a tubular reactor, consistent with a stirred tank reactor geometry, consisting of 0.18 liter of capacity placed within the microwave cavity. A backpressure regulator (TESCOM Industrial Controls, Elk River, Minn.) provided pressure control. Feedstock was pumped through the tubular reactor, and after spending the prescribed amount of time in the reactor (calculated from reactor volume/reactant flow rate), the reacted product was immediately cooled using an external chiller as the reaction product was routed through a chilled section of the reactor profile. The product was collected in a suitable container.

Procedure 2: Rheology Determination

Rheometric analysis of nanocomposite samples was conducted on an Ares Rheometric Scientific (TA instruments, New Castle, Del.) rheometer in Couvette mode.

Procedure 3: General Procedure for Fracture Toughness Testing

Fracture toughness was measured according to ASTM D 5045-99, except that a modified loading rate of 0.13 cm/minute (0.050 inches/minute) was used. A compact tension geometry was used, wherein the specimens had nominal dimensions of 3.18 cm by 3.05 cm by 0.64 cm (1.25 in. by 1.20 in. by 0.25 in.). The following parameters were employed: W=2.54 cm (1.00 in.); a=1.27 cm (0.50 in.); B=0.64 cm (0.25 in.). Measurements were made for 6 to 10 samples for each resin tested. Average values for both $K_q$ and $K_{IC}$ were reported in units of megapascals times the square root of meters, i.e., $MPa(m^{1/2})$, along with the number of samples used and standard deviation. Only those samples meeting the validity requirements of ASTM D 5045-99 were used in the calculations.

Procedure 4: General Procedure for Barcol Hardness Testing

Barcol hardness ($H_B$) was measured according to ASTM D 2583-95 (Reapproved 2001). A Barcol Impressor (Model GYZJ-934-1, available from Barber-Colman Company, Leesburg, Va.) was used to make measurements on specimens having a nominal thickness of 0.64 cm (0.25 in.). For each sample, 5 to 10 measurements were made and the average value was reported.

Procedure 5: General Procedure for Flexural Modulus (E') and Glass Transition Temperature (Tg) Determination Flexural storage modulus, E', was measured using an RSA2 Solids Analyzer (obtained from Rheometrics Scientific, Inc, Piscataway, N.J.) in the dual cantilever beam mode. The specimen dimensions had nominal measurements of 50 millimeters long by 6 millimeters wide by 1.5 millimeters thick. A span of 40 millimeters was employed. Two scans were run, the first having a temperature profile of −25° C. to +125° C. and the second scan having a temperature profile of −25° C. to +150° C. Both scans employed a temperature ramp of 5° C./minute, a frequency of 1 Hertz and a strain of 0.1%. The sample was cooled after the first scan using refrigerant at an approximate rate of 20° C./minute after which the second scan was immediately run. The flexural modulus measured in MPa at +25° C. on the second scan was reported. The tan delta peak of the second scan was reported as the glass transition temperature (Tg).

The materials listed in Table 1 were used to prepare functionalized particles as described in the Examples and Comparative Examples.

TABLE 1

| Materials | |
|---|---|
| Abbreviation | Component and Source |
| A-174 | Silquest A-174, 3-Methacryloxypropyltrimethoxysilane available from Momentive, Friendly, WV. |
| HK | HK Translucent Gelcoat Base, A blend of unsaturated polyester/styrene available from HK Research Hickory, NC |
| Silica sol (Nalco 2329) | A 41% solids by weight, aqueous, silica sol with an approximate particle size of 0.10 μm, available from Ondeo Nalco Chemical Company of Naperville, Ill.. |
| Silica sol (Nalco TX-13112) | A 33% solids by weight, aqueous, silica sol with an approximate particle size of 0.21 μm, available from Ondeo Nalco Chemical Company of Naperville, Ill |
| Silica sol (Nalco 2327) | A 41% solids by weight, aqueous, silica sol with an approximate particle size of 20 nm, available from Ondeo Nalco Chemical Company of Naperville, Ill.. |
| Silica sol (Nissan MP2040) | A 40% solids by weight, aqueous, silica sol with an approximate particle size of 0.19 μm, available from Nissan Chemical America Corporation, Houston, TX. |
| PhSi(OMe)$_3$ | Phenyltrimethoxysilane commercially available from Alfa Aesar Ward Hill, MA. |

TABLE 1-continued

Materials

| Abbreviation | Component and Source |
|---|---|
| A-1230 | Silquest A-1230, a polyethylene glycol(trimethoxy)silane available from Momentive, Friendly, WV. |
| Co-solvent | 1-Methoxy-2-propanol available from Aldrich Chemicals, Milwaukee, WI. |
| Epon 825 | Bisphenol A diglycidyl ether, commercially available from Hexion Specialty Chemicals, Houston Texas. |
| MEKP | MEK Peroxide Catalyst available from HK Research Hickory, NC |
| Cobalt Naphenate | 12% Cobalt Naphenate in styrene available from HK Research Hickory, NC |
| Ethacure 100 | Ethacure 100 is a liquid aromatic amine, commercially available from Albermarle, Baton Rouge, LA. |
| CB | Carbon Black, Commercially Available from Cabot Corporation, Boston, MA. |
| LICA 09 | Neopentyl(diallyl)oxy tri(dodecyl)benzene-sulfonyl titanate Ken-React Titanate Coupling Agent LICA 09, commercially available from Kenrich Petrochemicals, Inc. |
| LICA 38 | Titanate agent (Neo-alkoxy tris [dioctylpyrophosphato]titanate) commercially available from Kenrich Petrochemical, Bayonne, NJ. |
| GMS | 3M Scotchlite Glass Microspheres: Glass microspheres available from 3M company St. Paul, MN. |
| Au | Gold (Au) Metal & Powder commercially available from READE, East Providence, Rhode Island USA. |
| Octadecylamine | Commercially available from Aldrich, St. Louis, MO. |
| UB | Ultramarine blue, Sodium alumino sulphosilicate (Na8-10A16Si6O24S2-4), such as Ultramarine blue 690 ® manufactured by Nubiola USA Inc., Norcross, GA |
| CaCO3 | Calcium carbonate powder commercially available from Reade, East Providence, Rhode Island USA. |
| mPeg-COOH | mPEG-COOH, 1k, Methoxy-PEG-Carboxylic acid, MW 1000 Da, commercially available from as PBL-282 from Creative PEGWorks Winston Salem, NC |
| NZ39 | Zirconium IV 2,2(bis-propenolato)butanolato, tris 2-propenolato-O, a zirconate commercially available from Kenrich Petrochemical, Bayonne, NJ. |
| THF | Tetrahydrofuran, commercially available from Aldrich Chemicals, Milwaukee, WI. |
| $ZrO(CH_3COO)_2$ | Zirconyl acetate commercially available from Alfa Aesar, Ward Hill, MA |

Comparative Example A (C. Ex. A) and Comparative Example B (C. Ex. B)

Composites were prepared for each of the Comparative Examples A-B using a conventional batch reaction system. Silica sol, silanes and methoxy propanol was mixed at 95° C. for 22 hours in standard laboratory equipment. For Comparative Example A, the resulting surface treated silica sol was compounded into resin systems by solvent exchange and vacuum stripping of solvents according to methods described in U.S. Pat. No. 5,648,407 to Goetz et al. For Comparative Examples B the resulting surface treated silica sol was compounded into resin systems by solvent exchange and vacuum stripping of solvents according to methods described in the pending PCT patent application serial no. US 2007/077130 entitled "Resin Systems Including Reactive Surface-Modified Nanoparticles" (Goenner et al.). Samples were made by first dispersing dry surface modified $SiO_2$ into a solvent using a rotor static mixer. The appropriate resin was then added and the solvent removed by rotary evaporation. High degrees of surface functionalization were confirmed by dispersing the particles into appropriate epoxy or vinyl esters and achieving relatively low viscosity liquids. The actual formulations for the composites of Comparative Examples A-B are set forth in Table 2.

TABLE 2

Formulations - Comparative Examples A-B

| C. Ex. | Particle | Particle size (nm) | Surface Treatment (mole:mole ratio) | Resin | % Solids | Resin Viscosity at 1 s$^{-1}$ (Poise) |
|---|---|---|---|---|---|---|
| A | Nalco 2327 | 20 | PhSi(OMe)$_3$/ A-1230 (3:1) | Jeffco 1401 | 25 | 100 |
| B | Nalco 2329 | 98 | A-174/ A-1230 (1:1) | HK | 40 | 110 |

Comparative Example C (C. Ex. C)

Functionalized silica particles were prepared in a continuous flow hydrothermal reactor as described in co-pending U.S. Provisional patent application Ser. No. 61/040,338. Feedstock for Comparative Example C was prepared using a stirred aqueous dispersion of silica sol (see Table 3). Surface treatment agent (silane) was added to the sol and the resultant sol/silane mixture was stirred for 5 minutes at room temperature (23° C.). A mixture of a second surface treatment agent and co-solvent was added to the sol/silane mixture over a 5 minute period and the resulting dispersion was continuously stirred prior to delivery to the continuous reactor. Features of the reactants used in the formulation of the feedstock are set forth in Table 3. Dispersions were delivered to the continuous flow hydrothermal reactor at the flow rates and reactor temperatures described in Table 3.

Comparative Examples B, C and Example 2

Cured samples of Comparative Examples B and C and Example 2 were used to prepare specimens for physical property testing. Nanoparticle-containing gel coat with 1.25 wt % cobalt napthenate was placed in a wide-mouth plastic con-

TABLE 3

| C. Ex. | Silica Sol | Wt. silica sol (g) | 1-methoxy-2-propanol (g) | PhSi(OMe)$_3$ (g) | A-174 (g) | A-1230 (g) | Residence Time (min) | Temperature (° C.) | Flowrate (ml/min) |
|---|---|---|---|---|---|---|---|---|---|
| C | Nalco 2329 | 1970 | 1162 | — | 13.0 | 26.2 | 22.0 | 150 | 22.7 |

Examples 1-5

Functionalized silica particles were prepared in a microwave continuous flow reactor as described in Procedure 1. Feedstock was prepared using a stirred aqueous dispersion of silica sol (see Table 4). Surface treatment agent (silane) was added to the sol and the resulting sol/silane mixture was stirred for 5 minutes at room temperature (23° C.). A mixture of a second surface treatment agent and co-solvent was added to the sol/silane mixture over a 5 minute period and the resulting dispersion was continuously stirred prior to delivery to the continuous reactor. Dispersions were delivered to the microwave continuous flow hydrothermal reactor at the flow rates and reactor temperatures described in Table 4.

The surface-treated silica sols of Examples 1, and 3-5 were compounded into resin systems by solvent exchange and vacuum stripping of solvents according to methods described in U.S. Pat. No. 5,648,407 to Goetz et al. The sols of Example 2 were compounded by methods outlined in the pending PCT patent application serial no. US 2007/077130 entitled "Resin Systems Including Reactive Surface-Modified Nanoparticles" (Goenner et al.). High degrees of surface functionalization were confirmed by dispersing the particles into appropriate epoxy or vinyl ester resins and achieving relatively low viscosity liquids. The compositions of the nanocomposites are set forth in Table 4.

tainer. The container was covered and sealed and the contents were mixed at 2000 rpm for 30 seconds using a Speed-Mixer™ dual asymmetric centrifuge (Model DAC 600 FVZ-sp, available from Flack Tek, Incorporated, Landrum, S.C.). 1.0% by weight of methylethylketone peroxide (MEKP) solution (ca. 35 wt. % solution) was then added. The container was again sealed and the contents mixed at 2000 rpm for 30 seconds using the dual asymmetric centrifuge. After mixing the nanoparticle-containing gel coat was transferred to a float glass mold treated with VALSPAR MR 225 release material, and the gel coat was allowed to cure at room temperature for 24 hours followed by a post-cure at 70° C. for 4 hours. Samples made according to Example 2 and Comparative Example B were further evaluated according to Procedure 3 (General Procedure for Fracture Toughness Testing), Procedure 4 (General Procedure for Barcol Hardness Testing) and Procedure 5 (General Procedure for Flexural Modulus (F) and Glass Transition Temperature (Tg) Determination). Data are set forth in Table 5.

Example 2 produced through use of the microwave reactor showed statistically similar $K_{IC}$ and Barcol hardness with a higher modulus than the batch produced C. Ex. B and the HTR-produced C. Ex. C.

TABLE 4

| Ex. | Particle size (nm) | Silica sol (g) | Silica Sol (wt %) | A1230 (g) | A174 (g) | PhT MS (g) | methoxy-propanol (g) | Flowrate (ml/min) | Reactor Temp (° C.) | Resin | Resin Viscosity at 1 s$^{-1}$ (Poise) | Resin Loading (wt % particles) |
|---|---|---|---|---|---|---|---|---|---|---|---|---|
| 1 | 20 | 4932.2 | 40 | 156.7 | NA | 186.5 | 2910.0 | 78 | 165 | Jeffco 1401 | 100 | 20 |
| 2 | 98 | 13792.0 | 43 | 192.7 | 95.6 | NA | 7861.4 | 78 | 175 | HK | 110 | 40 |
| 3 | 142 | 7500.0 | 33 | 35.1 | NA | 41.7 | 4275.0 | 180 | 132 | EPON 825 | 142 | 45 |
| 4 | 190 | 1044.0 | 41 | 3.5 | NA | 4.1 | 619.1 | 78 | 175 | EPON 825 | 120 | 45 |
| 5 | 440 | 1088.0 | 40 | 1.6 | NA | 1.8 | 648.5 | 78 | 175 | EPON 825 | 100 | 45 |

TABLE 5

| Example | $H_B$ | $K_{IC}$ | $T_g$ (° C.) 1st heat | E' (MPa) @25° C. | $T_g$ (° C.) 2nd heat | E' (MPa) 2nd heat @25° C. | Modulus (ksi) | Failure Stress (psi) | Failure Strain (%) |
|---|---|---|---|---|---|---|---|---|---|
| C. Ex. B | 69 | 0.68 | 121 | 6.5 | 130 | 6.8 | 766 | 8,330 | 1.3 |
| C. Ex. C | 63 | 0.72 | 123 | 6.6 | 130 | 7.0 | 725 | 10,181 | 2.0 |
| Ex. 2 | 67 | 0.67 | 122 | 6.7 | 129 | 6.8 | 826 | 8,496 | 1.2 |

Examples 6-10

A feedstock is prepared as an aqueous mixture of particles and surface treatment agents at approximately 5-25 wt % solids (Table 6) and stirred at room temperature. The initial concentrations of surface treatment agents are determined based on the sizes of the particles used. The feedstock is pumped into a microwave reactor as part of a system similar to that schematically shown in FIG. 1 and described herein. A diaphragm pump (e.g., Lewa Ecodos series C80S model pump, American LEWA, Holliston Mass.) is used to move feedstock into the microwave reactor at various flow rates and reactor temperatures as described in Table 6. Reacted materials are collected at the outlet of the reactor. Optionally, in the case of Example 7 it is possible to flow feedstock through pressure feeding mechanisms involving loading the feedstock sol into a suitable pressure rated canister and using nitrogen gas as a propellant.

TABLE 6

Formulation Details of Starting Sols

| Ex. | Particle (Quantity (g)) | Methoxy-propanol/ Water (g) | Surface Treatment (Wt % relative to Particle) | Temperature Range (° C.) | Residence Time (min) | Approximate Flowrate (ml/min) |
|---|---|---|---|---|---|---|
| 6 | CB (500) | 750/7500 | LICA 09 (0.05 to 0.1) | 150-200 | 1-5 | 36-180 |
| 7 | GMS (100) | 950/950 | NZ39 (0.05 to 0.1) | 150-200 | 1-5 | 36-180 |
| 8 | Au (100) | 950/950 | Octadecylamine (0.05 to 0.1) | 150-200 | 1-5 | 36-180 |
| 9 | UB (300) | 850/850 | LICA 38 (0.05 to 0.1) | 150-200 | 1-5 | 36-180 |
| 10 | CaCO$_3$ (500) | 750/750 | mPEG-COOH (0.05 to 0.1) | 150-200 | 1-5 | 36-180 |

While embodiments of the invention have been described in sufficient detail, those skilled in the art will appreciate that changes or modifications, both foreseeable and unforeseen, may be made to the described embodiments without departing from the spirit or scope of the invention.

What is claimed:

1. A method for the preparation of functionalized particles, the method comprising:
   providing a feedstock at a first temperature, the feedstock comprising particles,
      a surface treatment agent reactive with the particles, and
      a solvent; and
   exposing the feedstock to microwave radiation to heat the feedstock and react the particles with the surface treatment agent to provide the functionalized particles in less than about 60 minutes;
   wherein exposing the feedstock to microwave radiation occurs: (i) prior to combining the particles with an organic matrix; and (ii) in a closed reaction vessel;
   wherein the particles in the feedstock comprise silica particles and the surface treatment agent is selected from the group consisting of organosilanes, organotitanates, organozirconates, organoacids, organoamines, organothiols, phosphinic acids and combinations thereof; and
   wherein exposing the feedstock to microwave radiation heats the feedstock to a temperature of at least 130° C.

2. The method according to claim 1 wherein the concentration of particles in the feedstock is between about 20% and about 60% by weight.

3. The method according to claim 1 wherein the particles in the feedstock are substantially symmetric particles and the solvent is water, the feedstock further comprising water-miscible organic solvent.

4. The method according to claim 3 wherein the substantially symmetric particles are substantially spherical particles having an average diameter less than about one micron.

5. The method according to claim 4 wherein the spherical particles comprise a mixture of particles having different diameters.

6. The method according to claim 1, wherein the particles in the feedstock further comprise inorganic oxide selected from the group consisting of zirconia, aluminum oxide, titanium dioxide, iron oxide, zinc oxide, antimony trioxide, boron oxide, boron suboxide, bismuth(III) oxide, copper(I) oxide, copper(II) oxide, chromium(III) oxide, iron(II) oxide, iron (III) oxide, magnesium oxide, manganese(IV) oxide and combinations of two or more of the foregoing.

7. The method according to claim 1, wherein the particles in the feedstock further comprise inorganic sulfide selected from the group consisting of copper(I) sulfide, copper(II) sulfide and zinc sulfide and combinations of two or more of the foregoing.

8. The method according to claim 1 wherein the particles in the feedstock further comprise inorganic materials selected from the group consisting of indium phosphide, aluminum phosphide, brass, metal coated glass, boron carbide, boron nitride, calcium carbide, calcium hydroxide, copper(II) hydroxide, lithium hydroxide, magnesium hydroxide, aluminum, aluminum hydroxide, aluminum sulfate, calcium sulfate, cobalt(II) carbonate, copper(II) carbonate, copper(II) nitrate, copper(II) sulfate, lithium carbonate, lithium nitrate, lithium sulfate, magnesium carbonate, magnesium phosphate, magnesium sulfate, manganese(II) sulfate monohydrate, manganese(II) phosphate, nickel(II) carbonate, nickel(II) hydroxide, nickel(II) nitrate, silicon dioxide, titanium dioxide, zinc carbonate, zinc oxide, zinc sulfate and combinations of two or more of the foregoing.

9. The method according to claim 1 wherein the silica particles in the feedstock are glass beads.

10. The method according to claim 1, wherein the organosilane is selected from the group consisting of [2-(3-cyclohexenyl) ethyl] trimethoxysilane, trimethoxy(7-octen-l-yl) silane, isooctyl trimethoxy-silane, N-(3-triethoxysilylpropyl) methoxyethoxyethyl carbamate, N-(3-triethoxysilylpropyl) methoxyethoxyethyl carbamate, 3-(methacryloyloxy)propyltrimethoxysilane, allyl trimethoxysilane, 3-acryloxypropyltrimethoxysilane, 3-(methacryloyloxy)propyltriethoxysilane, 3-(methacryloyloxy) propylmethyldimethoxysilane, 3-acryloyloxypropyl)methyldimethoxysilane, -9-3-(methacryloyloxy) propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-tbutoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), betacarboxyethylacrylate, 2-(2-methoxyethoxy)acetic acid, methoxyphenyl acetic acid, and combinations of two or more of the foregoing.

11. The method according to claim 1, wherein exposing the feedstock to microwave radiation provides the functionalized particles in a period of time from about 2 minutes to about 60 minutes, and wherein exposing the feedstock to microwave radiation heats the feedstock to a temperature in the range of 130° C. to 230° C., and wherein the feedstock is stirred during the exposing step.

* * * * *

UNITED STATES PATENT AND TRADEMARK OFFICE
CERTIFICATE OF CORRECTION

PATENT NO. : 8,318,120 B2  Page 1 of 1
APPLICATION NO. : 12/988092
DATED : November 27, 2012
INVENTOR(S) : James M Nelson It is certified that error appears in the above-identified patent and that said Letters Patent is hereby corrected as shown below:

Columns 11-12 (Table 1-continued)
Line 10, delete "Naphenate" and insert -- Naphthenate --

Line 10, delete "Naphenate" and insert -- Naphthenate --

Line 13, delete "Albermarle," and insert -- Albemarle, --

Column 14
Line 7 (approx.), delete "napthenate" and insert -- naphthenate --

Line 37, delete "(F)" and insert -- (E') --

Column 18
Line 13, in claim 10, after "acetic acid" delete "(MEEAA)"

Signed and Sealed this
Nineteenth Day of February, 2013

Teresa Stanek Rea
*Acting Director of the United States Patent and Trademark Office*